April 13, 1926.
W. J. WRIGHTON
LENS ATTACHMENT
Filed July 29, 1922
1,580,272
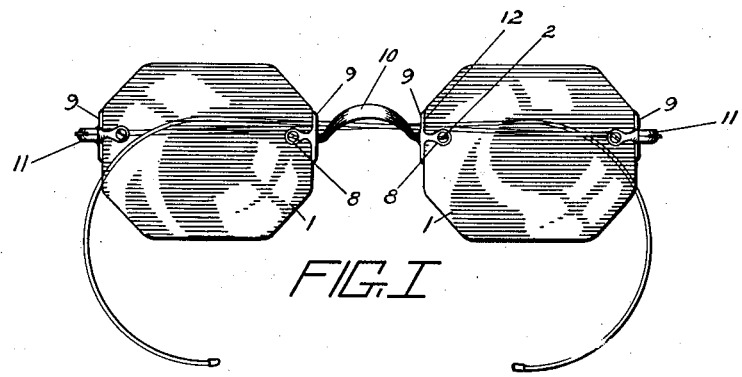
FIG. I
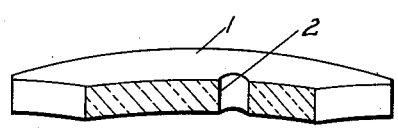
FIG. II
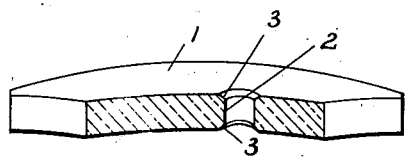
FIG. III
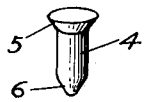
FIG. IV
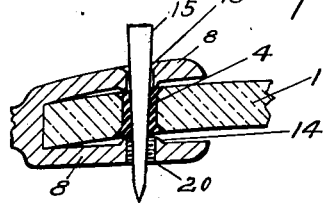
FIG. V
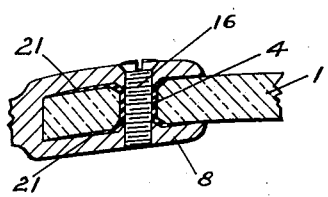
FIG. VI
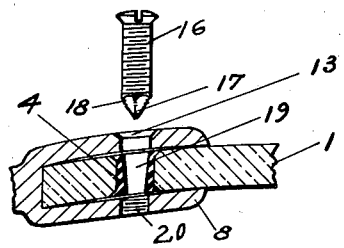
FIG. VII
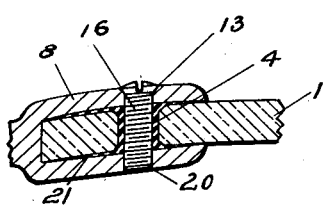
FIG. VIII
INVENTOR
W. J. WRIGHTON
BY
H. H. Styll & H. H. Parsons
ATTORNEYS Patented Apr. 13, 1926.

1,580,272

UNITED STATES PATENT OFFICE.

WILLIAM J. WRIGHTON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS ATTACHMENT.

Application filed July 29, 1922. Serial No. 578,303.

*To all whom it may concern:*

Be it known that I, WILLIAM J. WRIGHTON, a citizen of the United States, residing at Southbridge, in the county of Worcester and State of Massachusetts, have invented certain new and useful Improvements in Lens Attachments, of which the following is a specification.

This invention relates to improvements in lens attachments, and has particular reference to a novel and improved form of lens attachment and process of applying the same by which the lens will be firmly and securely held under all service conditions.

A further object of the present invention is the provision of an improved structure which shall insure the initial tight mounting of the lens without strain so that liability of subsequent loosening up of the parts is reduced to a minimum.

A further object of the invention is the provision of a structure of this character in which the lens shall have a slight yielding possibility in place of being absolutely rigidly held, but which yielding shall be accompanied by a retaining friction tending to keep the lens tight within the strap even though the latter may be somewhat distorted in place of allowing the lens to become loose and sloppy in fit, as has been a difficulty experienced with prior art structures.

A further object of the invention is the provision of a structure in which the screw shall be held not only by the opposed strap ear, but also by the lens lining material, thus reducing to a minimum the liability of backing out of the screw or loosening up of the same when the mounting is being worn.

Other objects and advantages of the present invention should be readily apparent by reference to the following specification taken in connection with the accompanying drawings, and it will be understood that I may make any modifications in the specific features hereinafter disclosed within the scope of the appended claims without departing from or exceeding the spirit of my invention.

Figure I represents a front view of one form of mounting embodying my improvements.

Figure II represents a view of the drilled lens.

Figure III represents a similar view with the lens screw aperture completed.

Figure IV represents a view of the filler plug adapted for use in connection with the lens.

Figure V represents a view illustrating the piercing of the plug in connection with a strap having projections on its inner face.

Figure VI represents a view of the lens completely mounted.

Figure VII represents a sectional view of an ordinary strap with the plug pierced ready for insertion of the lens screw.

Figure VIII represents a sectional view of the lens of Figure VII at the completion of the mounting operation.

In carrying out the present invention, the lenses 1 are drilled with screw receiving apertures 2, though not in the usual manner, inasmuch as the apertures are positioned as in ordinary lens drilling, but are made larger by an appreciable amount than the lens screw which is to be employed in connection therewith, and subsequent to the drilling operation the edges of the aperture are chamfered or bevelled as at 3. The lens having been thus prepared, I preferably insert within the aperture 2 an improved filler plug having a body portion 4 of size to substantially fit the aperture 2, and preferably having a tapered head 5 to substantially fit down into the apertured portion 3 at one side, the length of the plug being such as to project through the lens an appreciable amount. This plug or non-metallic bushing is made from a suitable heat softenable material such as zylonite, suitable rubber composition, or the like, and in mounting, the lens and plug are both heated, either together or separately to a temperature sufficient to soften and render plastic the plug 4, when the same is forced into the aperture in the lens and the protruding end or tip 6 trimmed down substantially flush with the lens, and preferably slightly spread in the trimming operation to fill up the chamfer 3. This can be readily accomplished through trimming, as with a sharp knife, or the like, leaving a solid plug locked in position within the lens, as is indicated in connection with Figures V and VII. The lens is then ready for insertion between the lens face engaging ears 8 of the lens mounting or strap having a portion 9 for engaging the edge of the lens. These straps may be carried either by a bridge member 10 or by end pieces or other fittings 11. In either event the edge engaging portion 9 is bent to as closely as possible fit the contour of the edge of the lens, which may be either as indicated at 12, as when a colonial shaped lens, for example, is employed, may be slightly flattened or notched on an oval or round lens, or may be round or oval, the flat shape however producing somewhat better results from the view point of permanent satisfactory mounting than do the more rounded forms. In any event, the strap having been properly bent or formed to fit the lens, the lens is then placed in position within it with the plug 4 alined with the screw receiving apertures 13 of the strap, which may be either plain or have the inwardly projecting taper lugs 14. The parts being in this position with the lens held tightly against the lens engaging portion 9, I then make use of the tapered piercing tool 15, which is forced downward to pierce a hole in the bushing 4 for reception of the lens screw, said hole being smaller in diameter than the lens screw. The lens screw 16, it will be noted, is formed with the long tapering point 17 with a semi-threaded portion as at 18, which coupled with the pyramid taper of the point serves to cut a thread in the aperture 19 in the plug 4, after the manner of a tap thus insuring a tight threaded engagement of the screw with the plug, passing thence into engagement with the threads 20 of the strap proper when further turning of the screw tightly draws the several parts together and securely locks them in that relation. At the same time as the screw is finally tightened up the material of the plug is slightly forced outward to form a thin film as at 21 between the surface of the lens and strap and thus insure the most tight general fit of the parts, rather than contact at one point only, as is liable to occur when the metal strap is drawn directly against a lens, and also making a slight cushioning effect so that there is less danger of breakage of the lens in handling or if the mounting is dropped.

The screw having been put in place and tightened the pointed terminal 17 is then trimmed off in the usual manner, as is indicated in the drawings, when the lens will be firmly held in position and any tendency to become loose by rocking or twisting is overcome due to the fact that the plug tightly fits the aperture in the lens while the lens screw is in tight engagement with the plug so that there is no possible twisting movement. This thus eliminates two difficulties previously experienced: one, the drooping of lenses due to loosening of the mounting, and the other twisting of the lenses with respect one to the other, due to loose fit of the ears 8, or loose ears of the lens on the screw even though the edge engaging member 9 properly prevented drooping of the lens.

I claim:

1. The process of mounting a lens, consisting in forming an aperture through the lens, chamfering the faces of the lens adjacent the aperture, inserting a plastic plug within the aperture, inserting the plugged lens within a strap having fastener receiving apertures, piercing the plug through the apertures to insure proper alinement of the fastener receiving apertures of the plug and strap, and tightening a fastener in the aligned apertures whereby the material of the plug while still plastic is compressed and caused to spread in a thin film between the lens and strap.

2. The process of mounting a lens consisting in forming an aperture through the lens, placing a heated plastic plug within the aperture, and placing the plugged lens within a strap having fastener receiving apertures to conform to the shape of the edge and sides of the lens, piercing the plug through the strap apertures while still plastic, and inserting a fastener through the apertures while the plug is still plastic, whereby when the plug is hardened the several parts will be united in a unitary structure.

3. The process of mounting an ophthalmic lens, comprising forming a screw receiving aperture in the lens of larger diameter than the screw to be used, filling the screw receiving aperture with a substance made plastic by heat, placing the lens between the perforated and threaded ears of a lens receiving strap, piercing the plastic through the apertures in the strap with a sharp pointed tool of smaller diameter than the screw to be used, said tool aligning the apertures in the strap and lens, and securing the lens and strap together by a sharp pointed screw of larger diameter than the aperture in the plastic inserted through the apertures in the strap and lens and screwed up tight by engagement with the threads in the strap, said screw displacing the plastic as it is screwed up to fill the aperture in the lens and to spread out between the strap and lens.

4. In a device of the character described, in combination with an apertured lens strap and an apertured lens having enlargements of the aperture at the ends, a filler plug adapted to become plastic by action of heat, having a body portion adapted to fit the main aperture of the lens, and a head portion adapted to fit one of the enlargements of the main aperture in the lens having a central aperture therethrough, and a screw member having a threaded body portion of larger diameter than the aperture in the plastic forced through the apertures in the strap and plastic to secure the lens in the strap and to force the plastic to fill the aperture in the lens and to spread out between the strap and lens, substantially as shown and described.

In testimony whereof I have affixed my signature.

WILLIAM J. WRIGHTON.